(12) United States Patent
Pala

(10) Patent No.: US 11,290,466 B2
(45) Date of Patent: Mar. 29, 2022

(54) SYSTEMS AND METHODS FOR NETWORK ACCESS GRANTING

(71) Applicant: CABLE TELEVISION LABORATORIES, INC, Louisville, CO (US)

(72) Inventor: Massimiliano Pala, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 498 days.

(21) Appl. No.: 16/103,982

(22) Filed: Aug. 16, 2018

(65) Prior Publication Data
US 2019/0058713 A1 Feb. 21, 2019

Related U.S. Application Data

(60) Provisional application No. 62/546,303, filed on Aug. 16, 2017.

(51) Int. Cl.
H04L 29/06 (2006.01)

(52) U.S. Cl.
CPC .......... *H04L 63/105* (2013.01); *H04L 63/123* (2013.01)

(58) Field of Classification Search
CPC ........................... H04L 63/105; H04L 63/123
See application file for complete search history.

(56) References Cited

U.S. PATENT DOCUMENTS

| | | | | |
|---|---|---|---|---|
| 6,691,232 B1* | 2/2004 | Wood | .................. | H04L 63/0815 726/6 |
| 7,685,377 B1* | 3/2010 | Milligan | ............... | G06F 3/0608 711/154 |
| 8,594,628 B1* | 11/2013 | Schroeder | ......... | H04W 12/0602 455/411 |
| 8,943,550 B2* | 1/2015 | Krsti | ..................... | G06F 16/122 726/2 |
| 9,407,624 B1* | 8/2016 | Myers | .................... | H04W 12/04 |
| 10,523,441 B2* | 12/2019 | Lingappa | .............. | H04L 63/107 |
| 2002/0147905 A1* | 10/2002 | Perlman | ................ | H04L 9/3265 713/157 |
| 2003/0097564 A1* | 5/2003 | Tewari | .............. | H04L 29/12113 713/171 |
| 2006/0242405 A1* | 10/2006 | Gupta | ..................... | H04L 9/321 713/156 |
| 2007/0005963 A1* | 1/2007 | Eldar | .................. | H04L 63/0876 713/168 |
| 2007/0106897 A1* | 5/2007 | Kulakowski | ............ | G06F 21/35 713/171 |

(Continued)

*Primary Examiner* — Lynn D Feild
*Assistant Examiner* — Abdullah Almamun
(74) *Attorney, Agent, or Firm* — Armstrong Teasdale LLP

(57) ABSTRACT

A server is provided for managing access of an electronic entity to a communications network. The server includes a contact point in operable communication with the electronic entity. The contact point is configured to receive a network access granting request message from the electronic entity. The server further includes a processing module, configured to process the received network access granting request message, validate trust indicators contained within the network access granting request message, authorize access of the electronic entity to the network upon validation of the trust indicators, and transmit a response message to the electronic entity indicating a level of access to the network that has been authorized.

30 Claims, 1 Drawing Sheet

(56) References Cited

U.S. PATENT DOCUMENTS

| | | | |
|---|---|---|---|
| 2008/0216160 A1* | 9/2008 | Rollet | H04L 63/083 726/6 |
| 2008/0307488 A1* | 12/2008 | Hammond, II | H04L 63/20 726/1 |
| 2009/0132813 A1* | 5/2009 | Schibuk | G06Q 20/322 713/158 |
| 2009/0205028 A1* | 8/2009 | Smeets | H04W 12/35 726/6 |
| 2010/0042848 A1* | 2/2010 | Rosener | G06F 21/32 713/184 |
| 2010/0211448 A1* | 8/2010 | Beenau | G06Q 30/0226 705/14.23 |
| 2012/0303830 A1* | 11/2012 | Tobioka | G06F 21/31 709/229 |
| 2012/0331540 A1* | 12/2012 | Hoffman | H04L 9/3268 726/10 |
| 2013/0074158 A1* | 3/2013 | Koskimies | G06F 21/6263 726/4 |
| 2013/0080769 A1* | 3/2013 | Cha | G06F 21/42 713/155 |
| 2013/0290735 A1* | 10/2013 | Rombouts | G06F 21/33 713/189 |
| 2014/0013109 A1* | 1/2014 | Yin | H04L 63/0823 713/156 |
| 2014/0137225 A1* | 5/2014 | Chickering | H04L 63/0807 726/8 |
| 2014/0289831 A1* | 9/2014 | Prakash | H04L 63/0876 726/7 |
| 2015/0263855 A1* | 9/2015 | Schulz | H04L 9/0827 713/155 |
| 2017/0238182 A1* | 8/2017 | Metral | H04L 63/0861 726/5 |
| 2018/0026799 A1* | 1/2018 | Pottier | H04L 9/3226 713/156 |
| 2018/0077030 A1* | 3/2018 | Lauer | H04L 41/5032 |
| 2018/0077081 A1* | 3/2018 | Lauer | H04L 47/50 |
| 2018/0077609 A1* | 3/2018 | Lauer | H04L 67/26 |
| 2019/0058713 A1* | 2/2019 | Pala | H04L 63/123 |
| 2019/0312939 A1* | 10/2019 | Noble | G06F 21/602 |

* cited by examiner

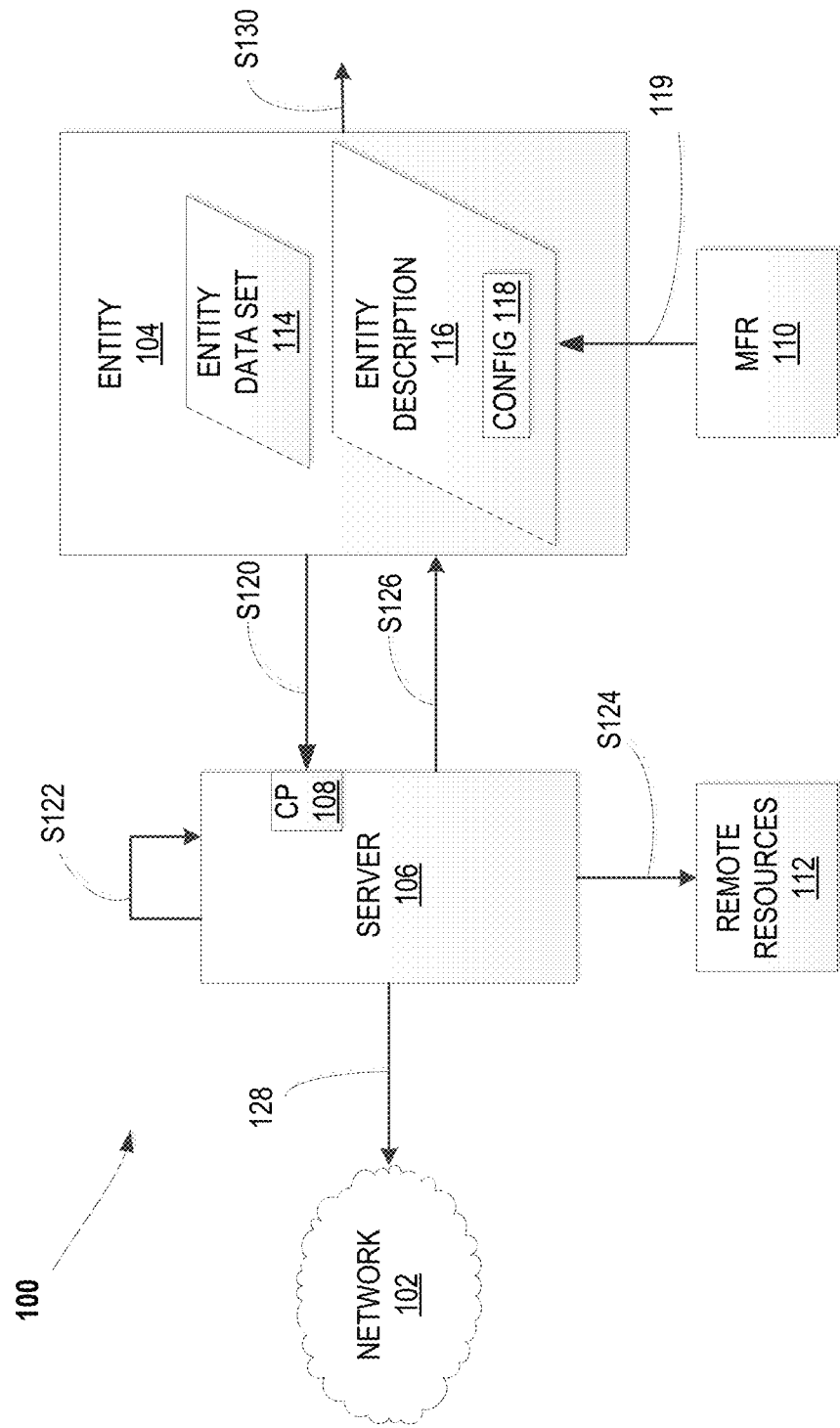

SYSTEMS AND METHODS FOR NETWORK ACCESS GRANTING

CROSS REFERENCE TO RELATED APPLICATIONS

This application claims the benefit of and priority to U.S. Provisional Patent Application Ser. No. 62/546,303, filed Aug. 16, 2017, which is incorporated herein by reference in its entirety.

BACKGROUND

The field of the disclosure relates generally to management of computer networks, and more particularly, to accessing such networks by electronic devices and entities.

Many conventional electronic communication networks require network access control (NAC) to manage access between devices and entities that utilize the network. NAC protocols manage which users, or user devices, have authorized permission to access the network or portions thereof. In conventional systems, NAC typically involves interception of connection requests from users, devices, or applications (hereinafter, "entities"), which are authenticated against a designated identity and access management system, and then access is accepted or denied based on parameters and policies, which may be programmed into the system. NAC deployment is conventionally challenging, due to the interaction between the various different operating protocols, security protocols, and technologies that span the network.

NAC is utilized to authorize, authenticate, and account for network connections, as well as assign control to the particular entity according to the access permission(s) granted thereto, and/or the role thereof. A NAC subsystem within the network typically is able to allow or block the entity's ability to access the network based on a security verification, such as the device identity, a system version, installed updates, etc. NAC subsystems may operate within wired or wireless networks, or wired/wireless hybrid networks. At present, the largest such network is the Internet, which may utilize a Border Gateway Protocol (BGP) as a routing protocol. One particular technique for validating and authorizing data within the BGP includes a domain name system (DNS)-based network layer reachability information (NLRI) origin for verifying the entity.

Secure access to the network often requires authentication of the particular entities prior to granting permissions. That is, entities communicating on the network typically have some capability of identifying other entities, as well as other information used to validate the data from the other entities. Electronic data validation techniques conventionally utilize cryptographic security measures to sign the data, including X.509 devices certificate profiles, X.509 user certificate profiles, a Public Key Infrastructure (PKI) hierarchy identifying a chain of trust, and/or other key distribution processes. Entity certificates may be validated according to a web of trust using the public key of a public/private PKI keypair.

Under such conventional techniques, different protocols exist that provide a description of a particular entity. Conventional NAC systems/subsystems may include an entity database (e.g., local, remote, or Cloud-based), a plurality of enforcement points (e.g., network devices, routers, switches, firewalls, gateways, wireless access points (APs), etc.), and a server that functions as the link between the database and the enforcement points. The NAC server may implement security policies to prevent unauthorized users or endpoints from accessing wired or wireless network resources. However, conventional NAC systems are presently incapable of providing a comprehensive trust model where an entity (e.g., a device) is able to prove its own identity and capabilities to the network, which may then be used to grant different levels of access to the network for the same entity. The need for such comprehensive trust models and self-proof is particularly needed with respect to the rapidly increasing number of entities being deployed on the Internet of Things (IoT).

BRIEF SUMMARY

In an embodiment, a server is provided for managing access of an electronic entity to a communications network. The server includes a contact point in operable communication with the electronic entity. The contact point is configured to receive a network access granting request message from the electronic entity. The server further includes a processing module, configured to process the received network access granting request message, validate trust indicators contained within the network access granting request message, authorize access of the electronic entity to the network upon validation of the trust indicators, and transmit a response message to the electronic entity indicating a level of access to the network that has been authorized.

In an embodiment, a method of granting access of an electronic entity to a communications network is provided. The method includes steps of receiving a network access granting request message from the electronic entity, processing trust indicators contained within the received network access granting request message, transmitting a response message to the electronic entity, wherein the response message includes an indication of network access being granted to the electronic entity, and granting access to the network by the electronic entity according to the indication provided in the response message.

In an embodiment, a communication system includes an electronic network, at least one electronic entity configured to operate using the electronic network, and a network access control subsystem. The network access control subsystem is configured to receive a network access granting request message from the at least one electronic entity, process the received network access granting request message to validate trust indicators received from the electronic entity, authorize access of the electronic entity to the network upon validation of the trust indicators, and transmit a response message to the electronic entity indicating an authorized level of access to the network.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 illustrates an exemplary flow process for granting secure access to a network by an entity, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used further herein, "CA" may refer to a certificate authority hosting a root certificate, and may further include, without limitation, one or more of a CA computer system, a CA server, a CA webpage, and a CA web service.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The systems and methods described herein enable the advantageous capability of providing information about an intended behavior of an entity on a network, as well as the associated trust model that enables granting of secure network access to the entity. In some embodiments, DNS security extensions may be leveraged as a registry for trust, and/or to bootstrap trust. In at least one embodiment, a digital ledger or a blockchain is leveraged to publish and manage a list of trusted CAs in the trust model (e.g., an X.509 trust model), in which a trusted third party CA is responsible for signing digital certificates. The CA may, for example, be further configured to implement an Online Certificate Status Protocol (OCSP) and/or a Certificate Revocation List (CRL) to provide information on various entities using the network. The embodiments herein describe and illustrate systems and methods for secure access granting of an entity to a network, including without limitation, the Internet, enterprise wireless networks/Wi-Fi networks, etc.

FIG. 1 illustrates an exemplary flow process 100 for granting secure access to a network 102 by an entity 104. In an exemplary embodiment, entity 104 accesses network 102 through a network granting server 106. Network 102 may be, for example, a wired network (e.g., IP and/or non-IP wired networks), a wireless network (e.g., IP-based and/or non IP-based wireless networks or cellular networks), a point-to-point networks (e.g., Bluetooth), and/or a point-to-multipoint network. Entity 104 may be, for example, an electronic device, device software, device firmware, a general application, and/or secure-element firmware. Server 106 may be, for example, a separate hardware component (e.g., an endpoint or enforcement point having a processor and a memory), or may be a software agent, executed by a processor and in communication with a memory, configured to provide server-side functionality which may be implemented as an identifiable software component, a subprocess of a larger software application, and/or embedded in the firmware of device 104.

In at least one embodiment, server 106 includes at least one contact point 108 for providing service to entity 104. Contact point 108 may be, for example an IP-and-Port combination or a broadcast address, or an address and port in case of an IP networks. In some embodiments, contact point 108 is conveyed through a dynamic host configuration protocol (DHCP, e.g., as a response option), through service records in the DNS, through other protocols such as Bonjour, SNMP, etc., or by transport layer-specific techniques (e.g., special messages or frames for non-IP networks). In some embodiments, server 106 provides services by a single transport protocol. In other embodiments, server 106 provides services by multiple protocols to support different communication mechanisms specific to the transport layer.

In the exemplary embodiment, process 100 is implemented with respect to a manufacturer 110 and remote resources 112. Manufacturer 110 may be, for example, an assembler or integrator of entity 104 or a firmware component thereof (e.g., where entity 104 is an electronic device), or an identifiable party that has released a software component and/or operating system that is, or is intended to be, installed onto entity 104. Remote resources 112 may include without limitation trust information, network or component configurations, and/other services.

In an exemplary embodiment, entity 104 includes entity data set 114 and an entity description 116. In some embodiments, entity description 116 further includes an entity configuration subset 118. Entity data set 114 may, for example, include relevant information about respective identities and capabilities of entity 104, which information might be provided locally, or remotely a uniform resource locator (URL)/hash value pair (e.g., {"URL", "HASH_VALUE"}), where the "HASH_VALUE" matches a hash calculated over contents retrieved using the URL. Entity data set 114 may be provided in different formats and/or different encodings, including without limitation, XML or JSON (e.g., ASCII, UTF-8, UTF-16, UTF-32), DER, Base64, or CBOR. In some embodiments, entity data set 114 is provided by manufacturer 110, and optionally authenticated by manufacturer 110 as well.

In the exemplary embodiment, entity data set 114 includes one or more of: (i) an identifier of manufacturer 110, which is optionally unique; (ii) a short description of manufacturer 110; (iii) an identifier of the model of entity 104; (iv) a unique identifier within the scope of the model and manufacturer 110, such as a serial number or part number of entity 104; (v) a description of entity 104 that may be used to display relevant information to a respective user thereof; (vi) cryptographic capabilities of entity 104 (e.g., a set of supported algorithms for authentication and secrecy), including an optional indicator that specifies whether an identified capability is provided through hardware or software; (vii) a set of identifiers that provide references to standards or requirements for which entity 104 is certified (e.g., NIST FIPS-140 Level 2, OpenADR Device, etc.); and (viii) one or more references to entity description 116 (e.g., a qualifier and a value such as a hash that uniquely identifies entity description 116), or to a different entity description, such as in the case where it is desirable to link different entities 104 together (e.g., an entity component of a larger entity device, or a software entity/hardware entity combination). In one example, a secure element (e.g., entity 104(A), not separately shown) may be installed within a larger device (e.g., entity 104(B), also not shown). In this case, the particular entity description 116(A) for entity 104(A) (e.g., the device) may include a reference to the particular entity description 116 (B) for entity 104(B) (e.g., the secure element).

In an embodiment, entity data set 114 further includes entity authentication credentials information, which can be utilized to validate authentication information of a network access granting request (e.g., a signature, discussed further below). The entity authentication credentials information may further include without limitation a digital certificate, the public key, the hash of the public key, a salted hash of a secret, a hash-based message authentication code (HMAC), or one or more other secure-password identification mechanisms. The data of the entity authentication credentials information may be provided inside the request message itself, or alternatively by reference, using a {"URL"; "HASH_VALUE"} pair where the "HASH_VALUE" matches the value of the hash calculated over the data retrieved via the URL. In at least one embodiment, authentication of entity data set 114 is provided by manufacturer 110, for example, by a signature or HMAC. According to the exemplary embodiment, entity data set 114 functions to provide a link 119 between entity 104 and manufacturer 110 (and also device information, if applicable), and to apply an entity signature to the network access granting request if the entity authentication credentials information is present in entity data set 114.

Further in the exemplary embodiment, entity description 116 represents a set of encoded information regarding entity 104, and may be encoded according to standardized formats (e.g., XML, JSON, DER, CBOR, etc.). In a case where entity 104 is separately provided with credentials, entity description 116 may be configured to carry information that facilitates authentication of such credentials when presented, and this carried information may be in the form of a digital certificate, a public key, a hash, etc. In some embodiments, entity description 116 further provides information regarding an intended behavior (e.g., a role) of entity 104 when granted access to network 102.

Entity description 116 may further include without limitation one or more of: (i) a unique identifier for the particular format in which entity description 116 is provided (e.g., manufacturer usage description (MUD), or another description language); (ii) encoding in which entity description 116 is provided, or multiple such encodings if permitted by the format; (iii) a default value in the case where entity description 116 is not provided; (iv) intended network behavior description of entity 104, as provided by manufacturer 110 (e.g., link 119); (v) intended network behavior description of entity 104, as provided by reference using a URL/hash value pair that uniquely identifies data referenced by the URL; (vi) a default (all access) value if an intended network behavior description is not provided; (vii) details about software installed on or within entity 104, including without limitation information regarding a device microchip, firmware, operating system, and/or latest patch version, all of which may be specific to the installed version of the relevant firmware, and may be subject to updating when a device entity 104 is updated; (viii) manufacturer credentials for manufacturer 110, which may include an X.509 certificate and/or the full chain of credentials, including the root of trust, and which may be based upon the particular technology and validation mechanisms of the particular credentials; (ix) information regarding the status of the manufacturer credentials at the time of signing, which may be carried (e.g., in the case of an X.509 certificate) by way of OCSP responses, CRLs, delta CRLs, or other indicators, and/or which may include different types of validity indicators as required by the specific mechanism(s) of the credential; (x) a timestamp applied to any or all of the foregoing data/credentials, which functions to provide attestation that the information was collected before a particular time, and which may be utilized to determine the validity of such provided information instead of the time recorded when the information may have been initially received by server 106; (xi) the full chain of credentials required to validate the timestamp; (xii) the validity status information (e.g., including a revocation status of a certificate, such as in the case of a timestamp credentials being in the form of an X.509 certificate; (xiii) an authentication provided by manufacturer 110, which may be in the form of a digital signature, an HMAC, a salted hash, or another authentication mechanism supported by the credentials type a manufacturer 110; and (xiv) an empty field for the authentication in the case where no manufacturer credentials are given or available.

Entity configuration subset 118 may be configured to provide a description of the required network access that is specific for the current configuration of entity 104. In an exemplary embodiment, entity configuration subset 118 is contained within entity description 116, and constitutes a subset thereof. In exemplary operation, entity configuration subset 118 is utilized by server 106 to dynamically restrict access to local resources, as well as remote resources 112, when a configuration event occurs on entity 104 (e.g., in the case of a device) and a new network access granting request is issued therefrom.

In further exemplary operation of process 100, one or more of the several components described above functions to enable a description of the network usage to be tied to the firmware/software running on the particular device represented as entity 104. Accordingly, an overall protocol of process 100 further advantageously enables network 102 and entity 104 to adequately address updates that are consistent with the firmware/software running and/or installed on entity 104. Further innovative techniques for enabling more reliable and efficient updates within the scope of the present embodiments are contemplated herein, and described in greater detail in related applications.

In the exemplary operation, process 100 begins at step S120, in which entity 104 requests, at contact point 108, to participate in or join network 102. In an exemplary embodiment of step S120, entity 104 requests an IP assignment by statically configuring its entity IP, by joining with a wireless and/or wired network using existing credentials (or none), or by pairing with a nearby base station (e.g., a Bluetooth or cellular network, not shown in FIG. 1). In some embodiments, where entity 104 has not provided server 106 access granting information (e.g., entity data set 114, entity description 116), entity 104 is not provided access to remote resources 112, nor or to any local resources other than server 106 itself, as well as those required to discover contact point 108 by entity 104.

In at least one embodiment of step S120, entity 104 may be configured to establish, request, or require access to necessary local resources simultaneously with this request by entity 104 to access network 102. For example, such simultaneous access requirements may be met by providing the access granting request at the same time that entity 104 is accessing network 102, such as during 802.1x exchanges, Bluetooth pairing, or by extensible authentication protocol (EAP) exchanges. Accordingly, when entity 104 requires access to local resources or remote resources 112, entity 104 contacts server 106 at contact point 108 (including discovery capabilities to determine the correct access point to communicate/interact with other entities that may already have such information) and sends a network access granting request or request message thereto.

In the exemplary embodiment, the network access granting request includes entity description 116, and may further include additional information such as a time of the request, nonces, configurations, cryptographic capabilities, and/or credentials (if available) of entity 104. When entity credentials are available, including without limitation cryptographic keys, secrets, keypairs, username and password combinations, static secrets, and secrets used to derive cryptographic keys, entity 104 may be further configured to use such credentials to authenticate the request message. Such self-authentication by entity 104 may be performed, for example, using digital signatures, message authentication codes, and/or other secure-password exchange and verification mechanisms.

More particularly, the network access granting request is utilized by entity 104 to convey trust information to server 106. The network access granting request may be, for example, provided in one or more formats or encodings, including without limitation one or more of XML (ASCII, UTF-8, UTF-16, UTF-32), JSON (ASCII, UTF-8, UTF-16, UTF-32), DER, Base64, and CBOR. In the exemplary embodiment, the network access granting request is composed of different sections, including at least a message header and a data portion. The message header may be created by entity 104, and may further carry information regarding protocol details (e.g., version). The data portion of the network access granting request may include one or more of entity data set 114 (e.g., as provided by manufacturer 110), entity description 116 (e.g., which may be also provided by manufacturer 110), entity configuration subset 118 (e.g., such data provided by entity 104), and additional entity authentication data that may be provided by entity 104.

In some embodiments, the network access granting request message may further include additional data required by the transport protocol for the particular functionality thereof, such as HTTP headers (different from the message header), etc. in the case where entity 104 is a device that does not carry/provide entity data set 114 or entity description 116, such device entities 104 may be configured to provide references to the relevant authentication information using a URL/hash value pair and an optional identifier of the format/encoding of the referenced data. Similar to the embodiments described above, the hash value should match the output of the hash function computed over data downloaded from the provided URL.

In the exemplary embodiment, the message header further includes one or more of: (i) the message format version; (ii) a nonce value (i.e., not repeated by the device) functional to tie the network access granting request with a subsequent response provided by server 106, and which further serves to provide protection against reply attacks in the case where server 106 memorizes used nonces; (iii) a date and time, if available, when entity 104 generated the network access granting request (e.g., in step S120); and (iv) a validity period (e.g., a number of seconds, minutes, hours, etc.) after which the network access granting request shall not be considered valid, and may or shall be discarded by server 106. In the exemplary embodiment, the message header is generated by entity 104. In alternative embodiments, the message header is pre-generated, and may be re-used in situations where a device entity 104 has limited capabilities, and/or where no nonce is actually implemented.

In step S122, server 106 processes the network access granting request by validating trust indicators of the request, such as digital signatures, message authentication codes, or other secure-password exchange and verification mechanisms. In an exemplary embodiment of step S122, server 106 directly processes the network access granting request. Alternatively, server 106 forwards the network access granting request to a different, upstream server, in which case server 106 functions as a proxy that enables requests (and responses, step S126, below) to be properly routed through network 102 without having to provide entity 104 with any knowledge regarding the infrastructure of network 102. In some embodiments of step S122, process 100 is further configured to establish a secure link against man-in-the-middle (MITM) attacks, and particularly in the case where a TLS or other security association is not implemented between server 106 and a particular client. Within the environment of local home or enterprise networks though, MITM attacks are not presently expected to be as great a concern.

In step S124, server 106 is optionally configured to access additional local resources or remote resources 112, if necessary, to validate the trust indicators. In an exemplary embodiment of step S124, remote resources 112 include without limitation one or more of trust information, configurations, and other related services.

In step S126, server 106 transmits a response message to entity 104. In the case where the network access granting request has been positively processed by server 106 (i.e., through validation of trust indicators), the response message includes a positive notification that the requested level and type of access to network 102 has been granted to entity 104. Where the network access granting request has not been positively processed, such as in the case of an error, lack of required credentials, or when trust information cannot be verified, the response message of step S126 alternatively includes an error notification, and optionally a description of the error and/or potential remediation options. In at least one embodiment of step S126, server 106 further provides a timestamp and a duration, after which entity 104 may be enabled to again send a network access granting request message based upon, for example, potential availability of new trust information (e.g., a revocation check) that may not have been available at the time of the initial request in step S120.

In some embodiments of step S126, the response message further includes authentication means, including one or more of a digital signature, a message authentication code, or another form of validation code such as a visual validation code or other human-verifiable data. In the case where the network access granting request includes a nonce, the response message from server 106 may be configured to include the same nonce.

In step S128, access to network 102 is granted to entity 104. In an exemplary embodiment of step S128, server 106 is configured to directly enable access by entity 104 to the requested resources of network 102, a subset of requested network resources, or to orchestrate access of entity 104 with other upstream or downstream servers, or other services such as firewalls, routers, or software defined network (SDN) management services. In at least one embodiment of step S128, server 106 determines that entity 104 is to be granted access to network 102 for only a limited amount of time, after which such granted access is revoked in whole or in part. In some such instances, process 100 is configured such that entity 104 is required to transmit an additional network access granting request to reestablish that portion of the network access that has been revoked. Step S128 may be performed simultaneously with step S126.

In the exemplary operation of step S128, in the case where the requested/required access to network 102 is granted to entity 104, entity 104 operates on network 102 as intended and/or planned. In step S130, entity 104 is optionally further configured to signal (e.g., to a user of entity 104, not shown, or another separate entity 104) of the successful access to, and operation on, network 102. In an alternative embodiment of step S130, in the case of failure to access network 102, entity 104 may be configured to signal the relevant error to one or more users, entities, or system components.

According to the innovative systems and methods described above, an advantageous NAC system/subsystem is provided that enables network usage that is dynamically free from the strict conventional requirements that tie the network usage to the firmware and software running on a device. According to the present techniques, an overall protocol for the system provides a more efficient entity-specific access grant to the network, and which thereby increases the versatility of the system to dynamically update the access according to updates to the software or firmware running or installed on the device entity. Through these innovative embodiments, entity authentication can be provided by the entity itself, and may be in the form of a digital signature with a private key, an HMAC, or another authentication mechanism supported by the credentials type of a particular entity. Accordingly, such entity authentication advantageously enables coverage of all portions of the network access granting request by the entity.

According to the techniques described herein, the server (e.g., server 106) may be configured to operate as an NAC subsystem for managing access of an entity (e.g. entity 104) to a network (e.g., network 102). These embodiments advantageously enable the server/NAC subsystem to reside within the entity itself, as part of the network, or as a separate hardware or software module. The present systems and methods are further efficiently adaptable with multiple types of wired and wireless networks (e.g., Passpoint, C4MI, etc.) and security credentials (e.g., EAP, EAP-TLS, EAP-TTLS, MSCHAPv2, SIM, EAP-SIM, EAP-AKA, GTC, WPA2, etc.), including certificates from a CA that enable a device entity to certify the network.

Exemplary embodiments of network access granting systems and methods are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown by drawings or by description, this convention is for convenience purposes and ease of description only. In accordance with the principles of the disclosure, a particular feature shown in the drawing may be referenced and/or claimed in combination with features described in the accompanying text.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A server for managing access of an electronic entity to a communications network, comprising:
 a contact point in operable communication with the electronic entity, wherein the contact point is configured to receive a network access granting request message from the electronic entity, the network access granting request message including a uniform resource locator (URL) and an entity hash value as trust indicators regarding the electronic entity; and
 a processing module, configured to:
  process the received network access granting request message;
  validate the trust indicators contained within the network access granting request message by (i) retrieving URL data using the URL included in the network access granting request message, and (ii) calculating a data hash value over the retrieved URL data that matches the entity hash value;
  authorize access of the electronic entity to the communications network upon validation of the trust indicators;
  transmit a response message to the electronic entity indicating a level of access to the communications network that has been authorized; and
 at least the contact point and the processing module is implemented using a hardware processor and a memory.

2. The server of claim 1, comprising a network access control subsystem.

3. The server of claim 2, comprising a hardware component including a processor and a memory, wherein the processing module includes the processor.

4. The server of claim 3, wherein the hardware component comprises one of an endpoint and an enforcement point of the network access control subsystem.

5. The server of claim 1, comprising a software agent executed by a processing module.

6. The server of claim 5, wherein the electronic entity comprises a hardware device, and wherein the software agent is embedded within firmware of the hardware device.

7. The server of claim 5, wherein the electronic entity comprises a software application, and wherein the software agent comprises a subprocess of the software application.

8. The server of claim 1, wherein the contact point comprises one or more of a broadcast address and an Internet protocol address and port combination.

9. The server of claim 8, wherein the contact point is conveyed using one or more of a dynamic host configuration protocol, a service record in a domain name security layer, and a transport layer-specific message or frame.

10. The server of claim 1, further comprising a transport layer, and wherein the server is configured to provide service to the electronic entity by one of a single transport protocol and multiple protocols that support a plurality of communication mechanisms specific to the transport layer.

11. The server of claim 1, wherein the processing module is further configured to dynamically restrict access of the electronic entity to resources local to the server upon receipt of the network access granting request message.

12. The server of claim 11, wherein the processing module is further configured to allow access of the electronic entity to resources capable of enabling the electronic entity to discover the contact point.

13. The server of claim 11, wherein the processing module is further configured to allow access of the electronic entity to the communications network for a limited duration.

14. The server of claim 1, wherein the network access granting request message includes at least one nonce, and wherein the processing module is further configured to include the at least one nonce in the response message.

15. The server of claim 1, wherein the processing module is further configured to forward the received network access granting request message to a separate upstream server.

16. A method for managing access of an electronic entity to a communications network, comprising steps of:
   receiving a network access granting request message from the electronic entity, wherein the network access granting request message includes a uniform resource locator (URL) and an entity hash value as trust indicators regarding the electronic entity;
   processing the received network access granting request message;
   validating the trust indicators contained within the network access granting request message by (i) retrieving URL data using the URL included in the network access granting request message, and (ii) calculating a data hash value over the retrieved URL data that matches the entity hash value;
   authorizing access of the electronic entity to the communications network upon validation of the trust indicators; and
   transmitting a response message to the electronic entity indicating a level of access to the communications network that has been authorized.

17. The method of claim 16, executed by a network access control subsystem.

18. The method of claim 17, wherein the network access control subsystem includes a hardware component having a processor and a memory.

19. The method of claim 18, wherein the hardware component is one of an endpoint and an enforcement point of the network access control subsystem.

20. The method of claim 16, executed by a software agent run by a processing module.

21. The method of claim 20, wherein the software agent is embedded within firmware of the processing module.

22. The method of claim 20, wherein the electronic entity is a software application, and wherein the software agent is a subprocess of the software application.

23. The method of claim 16, wherein the contact point is one or more of a broadcast address and an Internet protocol address and port combination.

24. The method of claim 23, wherein the contact point is conveyed using one or more of a dynamic host configuration protocol, a service record in a domain name security layer, and a transport layer-specific message or frame.

25. The method of claim 16, further comprising a step of providing service to the electronic entity by one of (i) a single transport protocol, and (ii) multiple protocols that support a plurality of communication mechanisms specific to a transport layer.

26. The method of claim 17, further comprising a step of dynamically restricting access of the electronic entity to resources local to the network access control subsystem upon receipt of the network access granting request message.

27. The method of claim 26, further comprising a step of allowing access of the electronic entity to resources capable of enabling the electronic entity to discover a contact point of the network access control subsystem.

28. The method of claim 26, further comprising a step of allowing access of the electronic entity to the communications network for a limited duration.

29. The method of claim 16, wherein the network access granting request message includes at least one nonce, and wherein the at least one nonce is included in the response message.

30. The method of claim 16, further comprising a step of forwarding the received network access granting request message to an upstream server.

* * * * *